(12) United States Patent
Setiabudi

(10) Patent No.: US 9,074,049 B2
(45) Date of Patent: Jul. 7, 2015

(54) THERMOSETTING COMPOSITION

(75) Inventor: Frans Setiabudi, Eschbach (DE)

(73) Assignee: Huntsman International LLC, The Woodlands, TX (US)

( * ) Notice: Subject to any disclaimer, the term of this patent is extended or adjusted under 35 U.S.C. 154(b) by 27 days.

(21) Appl. No.: 13/501,322

(22) PCT Filed: Sep. 23, 2010

(86) PCT No.: PCT/EP2010/064057
§ 371 (c)(1),
(2), (4) Date: Apr. 11, 2012

(87) PCT Pub. No.: WO2011/047929
PCT Pub. Date: Apr. 28, 2011

(65) Prior Publication Data
US 2012/0237753 A1    Sep. 20, 2012

(30) Foreign Application Priority Data
Oct. 21, 2009    (EP) .................................... 09173583

(51) Int. Cl.
| C09D 179/04 | (2006.01) |
| B05D 3/00 | (2006.01) |
| B32B 27/12 | (2006.01) |
| C08G 73/02 | (2006.01) |
| C08G 73/06 | (2006.01) |
| C08L 79/02 | (2006.01) |
| C08K 5/1515 | (2006.01) |
| C08K 5/357 | (2006.01) |

(52) U.S. Cl.
CPC ............ *C08G 73/0233* (2013.01); *C08G 73/06* (2013.01); *C08K 5/1515* (2013.01); *C08K 5/357* (2013.01); *C08L 79/02* (2013.01)

(58) Field of Classification Search
CPC . C08L 79/02; C08L 2666/02; C08G 73/0233; C08G 73/06; C08K 5/1515; C08K 5/357
USPC .......................................... 428/221; 524/876
See application file for complete search history.

(56) References Cited

U.S. PATENT DOCUMENTS

| 4,393,185 | A | 7/1983 | Berner et al. |
| 6,562,410 | B1 | 5/2003 | Mayer et al. |
| 2003/0190477 | A1 | 10/2003 | Shi et al. |
| 2004/0147640 | A1 | 7/2004 | Hwang et al. |
| 2007/0191555 | A1* | 8/2007 | Ishida et al. .................. 525/523 |

FOREIGN PATENT DOCUMENTS

| EP | 1 930 326 | 6/2008 |
| JP | 2009-057437 | 8/2007 |
| WO | 02/057279 | 7/2002 |
| WO | 2005/100432 | 10/2005 |

OTHER PUBLICATIONS

International Search Report regarding corresponding application No. PCT/EP2010/064057, dated Jan. 13, 2011.

* cited by examiner

*Primary Examiner* — Peter Y Choi
*Assistant Examiner* — Vincent A Tatesure

(57) ABSTRACT

A thermosetting composition comprising (a) at least one phosphorous-free dihydrobenzoxazine component; (b) at least a quaternary ammonium salt and (c) optionally a compound comprising at least an epoxy group is disclosed. Cured products made from these compositions have valuable chemical, physical and mechanical properties.

9 Claims, No Drawings

THERMOSETTING COMPOSITION

CROSS REFERENCE TO RELATED APPLICATIONS

This application is the National Phase of International Application PCT/EP2010/064057 filed Sep. 23, 2010 which designated the U.S. and which claims priority to European Patent Application (EP) 09173583.7, filed Oct. 21, 2009. The noted application is incorporated herein by reference.

TECHNICAL FIELD

The invention relates to thermosetting compositions comprising at least one phosphorous-free dihydrobenzoxazine component and at least one quaternary ammonium salt of aromatic-N-heterocyclic compounds. The invention also relates to the use of said thermosetting composition for the manufacture of a moulded article or for a resin transfer moulding process as well as a surface coating, a composite, a laminate, a casting resin, prepregs, prepregs for printed wiring boards, coatings for pipes, a resin of a resin transfer moulding process, wings of planes, blades of rotors, a matrix resin for electronic components or automotive or aerospace applications, or an adhesive for electronic components or automotive or aerospace applications. Additionally, the invention concerns cured products manufactured from said thermosetting composition and a process for the manufacturing of articles.

BACKGROUND OF THE INVENTION

Dihydrobenzoxazine components have been employed satisfactorily to produce prepregs, laminates, moulding materials, RTM (resin transfer moulding) systems, sealants, sinter powders, cast articles, structural composites parts, varnishes, surface coatings, electrical and electronic components by impregnating, coating, laminating or moulding processes.

Dihydrobenzoxazine components can easily be produced in several, well known ways by the reaction of bisphenols with a primary amine and formaldehyde, whereby the process can be carried out in the presence of solvents (see for example U.S. Pat. No. 5,152,993 or U.S. Pat. No. 5,266,695) or in the absence of solvents (see for example U.S. Pat. No. 5,543,516). Various hardeners such as novolacs, polyepoxides or polyamines are known to cure the dihydrobenzoxazine resin in order to obtain the valuable properties of the resins which make this class of thermosetting resins attractive.

EP 0 789 056 A2 describes a thermosetting resin composition with improved curability comprising dihydrobenzoxazines of polyphenols such as novolacs or bisphenol A and novolac phenolic resins. The composition is used as adhesive or for the manufacture of moulded articles, coatings, sealings, prepregs for printed wiring boards and metal-clad laminates with low water absorbance, improved non-flammability and high heat resistance. However, use of polyhydroxy functional novolacs as a hardener for the dihydrobenzoxazine resins lead sometimes to an undesirable high reactivity (low gel times) and, furthermore, to highly cross-linked resins, which generally are brittle.

WO 2006/035021 A1 describes bisdihydrobenzoxazines on the basis of phenolphthalein for the preparation of polymers, which show a high temperature stability and a good none-flammability. Polymerisation may be carried out in presence of catalysts, such as thiodipropionic acid, phenols or sulfonyl diphenol. However, the use of quaternary ammonium salts as catalysts is not mentioned in WO 2006/035021 A1.

WO 02/057279 A1 discloses phosphorous containing dihydrobenzoxazine resin composition comprising epoxy resins and quaternary ammonium salts as a possible hardener. However, the phosphorous containing dihydrobenzoxazine resin systems demonstrate a long gel time and a low reaction enthalpy which render said resin systems unsuitable for high reactive coating and moulding applications.

Especially for resin transfer molding processes it is desirable to be able to keep the thermosetting composition in a liquid or molten liquid state. Therefore, it is necessary that at this stage of the process the thermosetting composition does not cure rapidly. However, once the article is shaped it is desired that once the temperature is increased the thermosetting composition cures rapidly.

SUMMARY OF THE INVENTION

It was an object of the present invention to provide a thermosetting composition which demonstrate a good balance between workability at increased temperatures and an increased reactivity. Furthermore, it was a further object of the present invention to provide a thermosetting composition which demonstrate an increased Tg which is especially important for applications in the automotive and aerospace industry.

It has now been surprisingly found that specific quaternary ammonium salts are excellent catalysts for the polymerization of components containing at least one, preferably two dihydrobenzoxazine groups, especially bis(dihydrobenzoxazine) compounds. The thermosetting compositions obtained demonstrate a higher reactivity while the workability at increased temperature is maintained. Additionally, it has surprisingly been found that the thermosetting compositions demonstrate an optimum latency and storage stability despite the increased reactivity. The thermosetting composition can therefore be stored and shipped in one container which is an economic advantage and much more comfortable for users. Additionally, the processability and control during molding operations such as pressing is improved which results in improved dimensional accuracy.

DETAILED DESCRIPTION OF THE INVENTION

A first embodiment of the invention is a thermosetting composition comprising (a) at least one phosphorous-free dihydrobenzoxazine component; and (b) at least one quaternary ammonium salt comprising i) a cation of an aromatic-N-heterocyclic compound which comprises one or two nitrogen atoms and ii) an anion.

Component (a):

An essential component of the thermosetting composition according to the present invention is a phosphorous-free component (a) comprising at least one dihydrobenzoxazine group.

Preferably component (a) is a bis(dihydrobenzoxazine), i.e. a compound comprising two dihydrobenzoxazine groups.

More preferably component (a) is a bis(dihydrobenzoxazines) of formula (I),

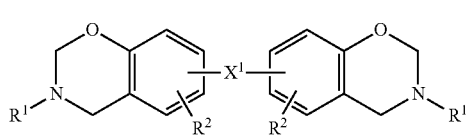

wherein
each $R^1$ is independently $C_1$-$C_{18}$ alkyl, $C_3$-$C_{12}$ cycloalkyl, $C_3$-$C_{12}$ cycloalkyl which is substituted with a $C_1$-$C_4$-alkyl; $C_6$-$C_{18}$ aryl which is unsubstituted or substituted by one or more $C_1$-$C_6$ alkyl groups or $C_1$-$C_6$ alkoxy groups;

each $R^2$ is independently hydrogen, dialkylamino; alkylthio; alkylsulfonyl; $C_1$-$C_{18}$ alkyl; $C_1$-$C_{18}$ alkenyl; $C_1$-$C_{18}$ alkoxy; $C_1$-$C_{18}$ alkoxy-$C_1$-$C_{18}$-alkylene; $C_5$-$C_{12}$ cycloalkyl which is unsubstituted or substituted by one or more $C_1$-$C_6$ alkyl groups or $C_1$-$C_6$ alkoxy groups; $C_6$-$C_{12}$ aryl which is unsubstituted or substituted by one or more $C_1$-$C_6$ alkyl groups or $C_1$-$C_6$ alkoxy groups; or $C_6$-$C_{12}$ aryl-$C_1$-$C_{18}$-alkylene wherein the aryl moiety is unsubstituted or substituted by one or more $C_1$-$C_6$ alkyl groups or $C_1$-$C_6$ alkoxy groups;

$X^1$ is a bivalent bridging group selected from —O—, —S—, —S(O)—, —S(O)$_2$—, —C(O)—, —N($R^3$)—, —O—C(O)—, —O—C(O)—O—, —S(O)$_2$—O—, —O—S(O)$_2$—O—, $C_1$-$C_{18}$ alkylene, $C_2$-$C_{18}$ alkenediyl, $C_3$-$C_{12}$ cycloalkylene, $C_5$-$C_{12}$ cycloalkenediyl, —Si(O$R^3$)$_2$— and —Si($R^3$)$_2$—; and $R^3$ is H, $C_1$-$C_{12}$ alkyl, $C_5$ or $C_6$ cycloalkyl, $C_5$ or $C_6$ cycloalkyl substituted with methyl, ethyl, phenyl; benzyl or phenyleth-2-yl.

When the radicals $R^1$ to $R^3$ are alkyl, alkoxy or alkoxyalkylene, those alkyl, alkoxy or alkylene radicals can be straight-chained or branched and may contain 1 to 12, more preferably 1 to 8 and most preferably 1 to 4 C atoms.

Examples of alkyl groups are methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl and octadecyl.

Suitable alkoxy groups are, for example, methoxy, ethoxy, isopropoxy, n-propoxy, n-butoxy, isobutoxy, sec-butoxy, tert-butoxy and the various isomeric pentyloxy, hexyloxy, heptyloxy, octyloxy, nonyloxy, decyloxy, undecyloxy, dodecyloxy, tridecyloxy, tetradecyloxy, pentadecyloxy, hexadecyloxy, heptadecyloxy and octadecyloxy.

Examples of alkoxy-alkylene groups are 2-methoxyethylene, 2-ethoxyethylene, 2-methoxypropylene, 3-methoxypropylene, 4-methoxybutylene and 4-ethoxybutylene.

Cycloalkyl is preferably $C_5$-$C_8$ cycloalkyl, especially $C_5$ or $C_6$ cycloalkyl. Some examples thereof are cyclopentyl, cyclopentyl substituted with methyl, cyclohexyl, cycloheptyl and cyclooctyl.

Aryl groups are, for example, phenyl, naphthyl and anthryl.

The aryl-alkylene group preferably contains from 7 to 12 carbon atoms and especially from 7 to 11 carbon atoms. It can be selected from the group consisting of benzyl, phenylethylene, 3-phenylpropylene, α-methylbenzyl, 4-phenylbutylene or α,α-dimethylbenzyl.

$R^1$ is preferably $C_1$-$C_{12}$ alkyl, $C_5$-$C_8$ cycloalkyl or $C_5$-$C_8$ cycloalkyl which is substituted by one or more $C_1$-$C_4$ alkyl groups or $C_1$-$C_4$ alkoxy groups, $C_6$-$C_{10}$ aryl which is unsubstituted or substituted by one or more $C_1$-$C_4$ alkyl groups or $C_1$-$C_4$ alkoxy groups.

In a more preferred embodiment of the present invention, $R^1$ is $C_1$-$C_6$ alkyl; phenyl; benzyl; or phenyl or benzyl wherein the aryl moiety is substituted by one or more methyl groups or methoxy groups.

According to the invention, components of formula (I) are preferred, in which $R^1$ is isopropyl, iso- or tertiary-butyl, n-pentyl or phenyl.

$R^2$ in the component of formula (I) is preferably hydrogen.

Cycloalkylene $X^1$ may be a polycycloalkylene having 2 to 4 condensed and/or bridged carbon cycles such as bicyclo-[2,2,1]-heptanylene or tricyclo-[2,1,0]-decanylene.

$X^1$ is preferably a direct bond or more preferably a bivalent bridging group selected from —O—, —S—, —S(O)—, —S(O)$_2$—, —C(O)—, $C_1$-$C_2$alkylene, and $C_1$-$C_{12}$alkenediyl.

It was found that S containing bridging groups improve flammability resistance and these groups may be selected if said resistance is desired.

$R^3$ is preferably H, $C_1$-$C_{12}$ alkyl, $C_5$ or $C_6$ cycloalkyl, $C_5$ or $C_6$ cycloalkyl substituted with methyl, ethyl, phenyl; benzyl or phenyleth-2-yl.

In a preferred embodiment, $R^3$ is selected from $C_1$-$C_4$ alkyl, cyclohexyl, phenyl or benzyl.

According to a preferred embodiment of the present invention component (a) is a bis(dihydrobenzoxazine) prepared by the reaction of an unsubstituted or substituted bisphenol having at least one unsubstituted position ortho to each hydroxyl group, with formaldehyde and a primary amine.

Bis(dihydrobenzoxazines) on the basis of bisphenols are well known, commercially available and can be prepared according to well known and published methods.

The unsubstituted or substituted bisphenol is preferably selected from hydrochinone, resorcinol, catechol, or from bisphenols of formula (II),

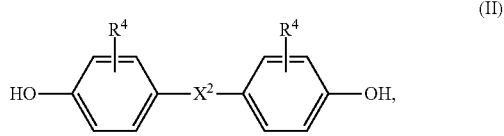

wherein
$R^4$ is independently hydrogen, dialkylamino; alkylthio; alkylsulfonyl; $C_1$-$C_{18}$ alkyl; $C_1$-$C_{18}$ alkenyl; $C_1$-$C_{18}$ alkoxy; $C_1$-$C_{18}$ alkoxy-$C_1$-$C_{18}$-alkylene; $C_5$-$C_{12}$ cycloalkyl which is unsubstituted or substituted by one or more $C_1$-$C_6$ alkyl groups or $C_1$-$C_6$ alkoxy groups; $C_6$-$C_{12}$ aryl which is unsubstituted or substituted by one or more $C_1$-$C_6$ alkyl groups or $C_1$-$C_6$ alkoxy groups; or $C_6$-$C_{12}$ aryl-$C_1$-$C_{18}$-alkylene wherein the aryl moiety is unsubstituted or substituted by one or more $C_1$-$C_6$ alkyl groups or $C_1$-$C_6$ alkoxy groups;

$X^2$ is a bivalent bridging group selected from —O—, —S—, —S(O)—, —S(O)$_2$—, —C(O)—, —N($R^3$)—, —O—C(O)—, —O—C(O)—O—, —S(O)$_2$—O—, —O—S(O)$_2$—O—, $C_1$-$C_{18}$ alkylene, $C_2$-$C_{18}$ alkenediyl, $C_3$-$C_{12}$ cycloalkylene, $C_5$-$C_{12}$ cycloalkenediyl, —Si(O$R^3$)$_2$— and —Si($R^3$)$_2$—; and $R^3$ is H, $C_1$-$C_{12}$ alkyl, $C_5$ or $C_6$ cycloalkyl, $C_5$ or $C_6$ cycloalkyl substituted with methyl, ethyl, phenyl; benzyl or phenyleth-2-yl.

$R^3$ in formula (II) may independently have the same preferred meanings as $R^3$ in formula (I).

$R^4$ in formula (II) may independently have the same preferred meanings as $R^2$ in formula (I).

$R^4$ is in particular hydrogen or $C_1$-$C_4$ alkyl, such as methyl or ethyl.

$X^2$ preferably is a direct bond or a bivalent bridging group selected from —O—, —S—, —S(O)$_2$—, —C(O)—, —N(R$^3$), $C_1$-$C_4$ alkylene (for example methylene or 1,2-ethylene), $C_2$-$C_6$ alkenediyl (for example ethenediyl, 1,1- or 2,2-propenediyl, 1,1- or 2,2-butenediyl, 1,1-, 2,2- or 3,3-pentenediyl, or 1,1-, 2,2- or 3,3-hexenediyl) or $C_5$-$C_8$ cycloalkenediyl (for example cyclopentenediyl, cyclohexenediyl or cyclooctenediyl), whereby $R^3$ is preferably hydrogen or $C_1$-$C_4$ alkyl.

If an improved flammability resistance is desired, $X^2$ is a bivalent bridging group selected from —S—, and —S(O)$_2$—.

Some preferred examples of bisphenols used to prepare bis(dihydrobenzoxazines) are 4,4'-dihydroxybiphenyl, (4-hydroxyphenyl)$_2$C(O) (DHBP), bis(4-hydroxyphenyl) ether, bis(4-hydroxyphenyl)thioether, bisphenol A, bisphenol AP, bisphenol E, bisphenol H, bisphenol F, bisphenol S, bisphenol Z, phenolphthalein and bis(4-hydroxyphenyl)tricyclo-[2,1,0]-decan.

According to a particularly preferred embodiment of the present invention component (a) is selected from the group consisting of components of formulae (III) to (XII)

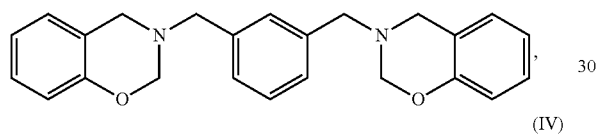
(III)

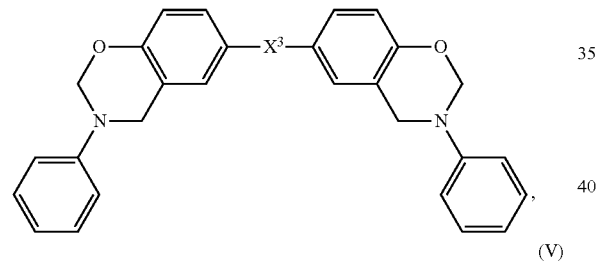
(IV)

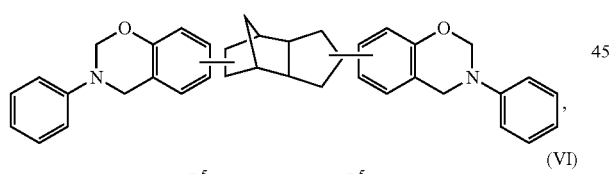
(V)

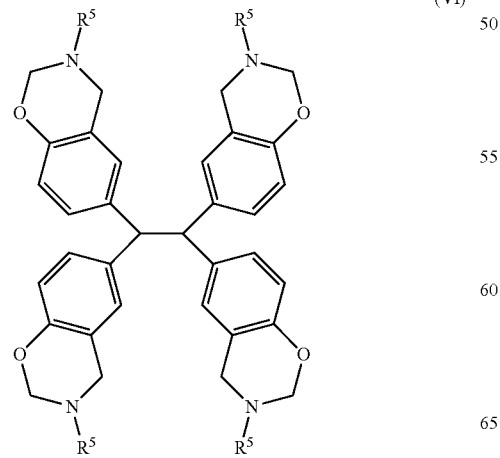
(VI)

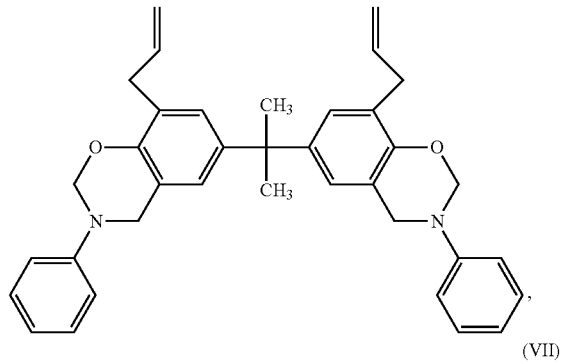
(VIa)

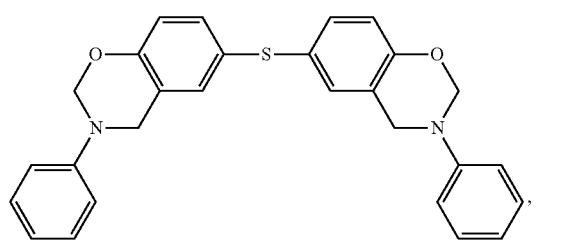
(VII)

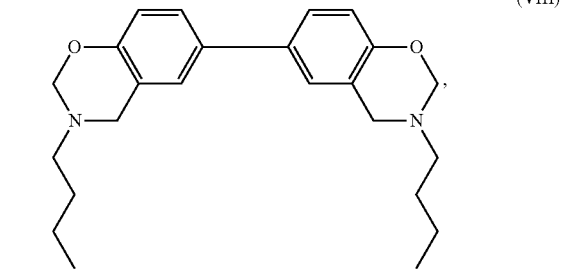
(VIII)

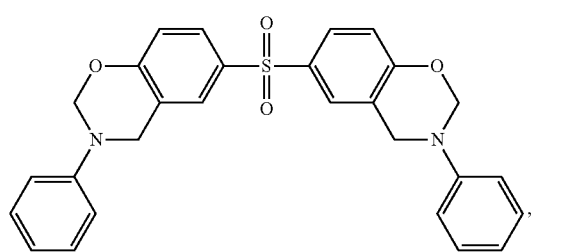
(IX)

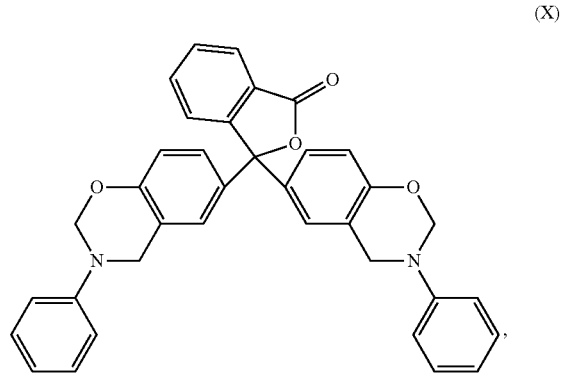
(X)

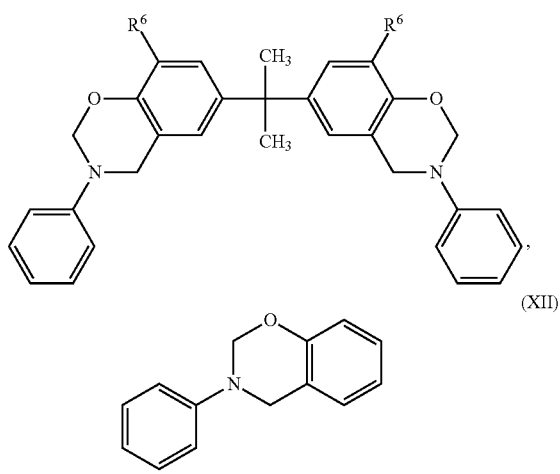

(XI)

(XII)

or any mixtures thereof wherein $X^3$ is a bivalent bridging group selected from —O—, —S—, —S(O)—, —S(O)$_2$—, —C(O)—, —N(R$^3$)—, —O—C(O)—, —O—C(O)—O—, —S(O)$_2$—O—, —O—S(O)$_2$—O—, $C_1$-$C_{18}$ alkylene, $C_2$-$C_{18}$ alkenediyl, $C_3$-$C_{12}$ cycloalkylene, $C_5$-$C_{12}$ cycloalkenediyl, —Si(OR$^3$)$_2$— and —Si(R$^3$)$_2$—;

$R^3$ is H, $C_1$-$C_{12}$ alkyl, $C_5$ or $C_6$ cycloalkyl, $C_5$ or $C_6$ cycloalkyl substituted with methyl, ethyl, phenyl; benzyl or phenyleth-2-yl;

$R^5$ is independently $C_1$-$C_{18}$ alkyl, or $C_3$-$C_{12}$ cycloalkyl, $C_3$-$C_{12}$ cycloalkyl substituted with $C_1$-$C_4$ alkyl, $C_6$-$C_{18}$ aryl which is unsubstituted or substituted by one or more $C_1$-$C_6$ alkyl groups or $C_1$-$C_6$alkoxy groups; and $R^6$ is independently H, etheneyl or allyl.

Component (a) can be present in the thermosetting composition of the invention in an amount up to 98 wt.-%, preferably in an amount ranging from 40 to 95 wt.-%, more preferably from 50 to 90 wt.-% and most preferably from 60 to 85 wt.-%, based on the weight of the entire thermosetting composition.

Component (b):

A further essential component of the thermosetting composition according to the present invention is component (b) which is a quaternary ammonium salt comprising i) a cation of an aromatic-N-heterocyclic compound which comprises one or two nitrogen atoms and ii) an anion.

The quaternary ammonium salts defined as componen (b) can be obtained as disclosed, for example, in EP-A-0 066 543 and EP-A-0 673 104.

The salts of aromatic heterocyclic nitrogen-containing compounds preferably have non-nucleophilic anions, for example complex halide anions, such as BF4$^-$, PF6$^-$, SbF6$^-$, SbF5(OH)$^-$ and AsF6$^-$. Examples of aromatic heterocyclic nitrogen-containing compounds are especially six-membered nitrogen-containing heterocycles, such as pyridine, pyrimidine, pyridazine, pyrazine and alkyl or aryl derivatives thereof, and benzo and naphtho derivatives thereof.

Preferably the quaternary ammonium salt (b) comprise a cation i) of a substituted or unsubstituted aromatic-N-heterocyclic compound which is selected from pyridine, pyrimidine, pyridazine, pyrazine, picoline, lutidine, quinoline, isoquinoline, quinoxaline, phthalazine, quinazoline, acridine, phenanthridine and phenanthroline. Preferably, the quaternary ammonium salt is a substituted or unsubstituted quinolinium salt. More preferably the cation i) is an aromatic-N-heterocyclic compound which is substituted at at least one of the heterocyclic N-atoms with a substituted or unsubstituted rest selected from the group consisting of alkyl, aryl, alkoxy-alkylene, aryl-alkylene, alkanoyl and benzoyl.

According to a preferred embodiment of the present invention the quaternary ammonium salt (b) comprises a cation selected from the formulae (XIII), (XIV) and (XV):

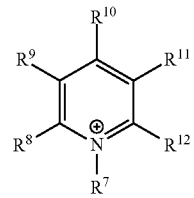

(XIII)

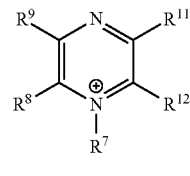

(XIV)

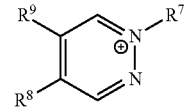

(XV)

wherein $R^7$ is $C_1$-$C_{18}$ alkyl; aryl-$C_1$-$C_8$ alkylene wherein the aryl moiety is unsubstituted or substituted by one or more linear or branched $C_1$-$C_{12}$ alkyl, $C_1$-$C_8$ alkoxy-$C_1$-$C_8$ alkylene, $C_1$-$C_{12}$ alkyloxy, $C_1$-$C_{12}$ alkylcarbonyl, halogen or hydroxyl; $C_3$-$C_{15}$ alkoxy-$C_1$-$C_8$ alkylene or benzoyl-methylene;

each of $R^8$, $R^9$, $R^{10}$, $R^{11}$ and $R^{12}$ independently of the other is hydrogen, $C_1$-$C_4$ alkyl or phenyl, or $R^8$ and $R^9$ or $R^9$ and $R^{10}$ or $R^{10}$ and $R^{11}$ or $R^{11}$ and $R^{12}$, together with the two carbon atoms to which they are attached, are a fused benzo, naphtho, pyridino or quinolino radical.

Preferably $R^7$ is selected from the group consisting of methyl, ethyl, n-propyl, iso-butyl, sec-butyl, tert-butyl, dodecyl, octadecyl, benzyl, phenyleth-2-yl, acetyl and benzoyl.

Further, the thermosetting composition according to the present invention preferably comprises at least one quaternary ammonium salt (b) which comprises a cation selected from one or more of the formulae (XVI) to (XXIV) wherein Y is either-CH= or a nitrogen atom:

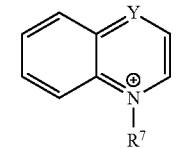

(XVI)

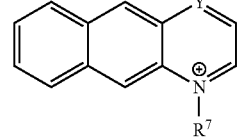

(XVII)

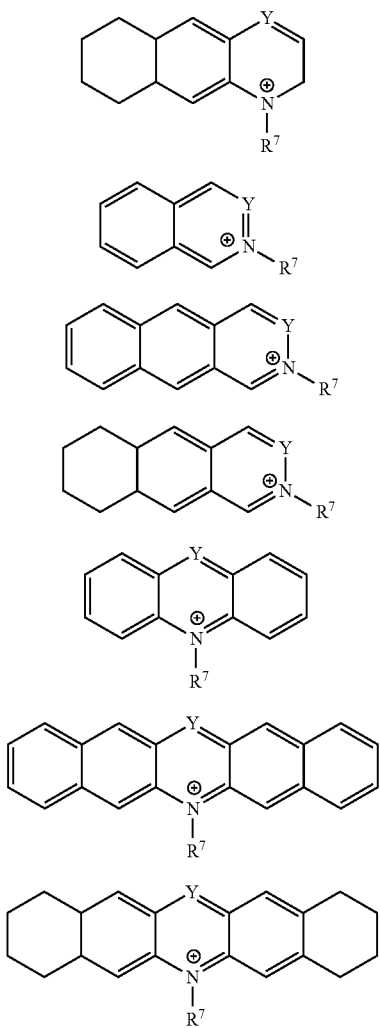

(XVIII) (XIX) (XX) (XXI) (XXII) (XXIII) (XXIV)

wherein $R^7$ is $C_1$-$C_{18}$ alkyl; aryl-$C_1$-$C_8$ alkylene wherein the aryl moiety is unsubstituted or substituted by one or more linear or branched $C_1$-$C_{12}$ alkyl, $C_1$-$C_8$ alkoxy-$C_1$-$C_8$ alkylene, $C_1$-$C_{12}$ alkyloxy, $C_1$-$C_{12}$ alkylcarbonyl, halogen or hydroxyl; $C_3$-$C_{15}$ alkoxy-$C_1$-$C_8$ alkylene or benzoyl-methylene.

In the above-mentioned formulae (XIII) to (XV) and (XVI) to (XXIV) $C_1$-$C_{18}$ alkyl for $R^7$ is preferably methyl, ethyl, n-propyl, i-propyl, n-butyl, sec-butyl or tert-butyl and aryl-$C_1$-$C_8$ alkylene wherein the aryl moiety is unsubstituted for $R^7$ is preferably benzyl or phenyleth-2-yl.

Especially preferred is a quaternary ammonium salt (b) which comprises a cation of the following formula:

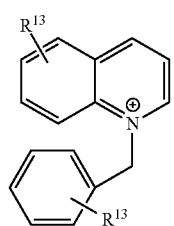

wherein each $R^{13}$ independently of the other is is $C_1$-$C_{18}$ alkyl; aryl-$C_1$-$C_8$ alkylene wherein the aryl moiety is unsubstituted or substituted by one or more linear or branched $C_1$-$C_{12}$ alkyl, $C_1$-$C_8$ alkoxy-$C_1$-$C_8$ alkylene, $C_1$-$C_{12}$ alkyloxy, $C_1$-$C_{12}$ alkylcarbonyl, halogen or hydroxyl; $C_3$-$C_{15}$ alkoxy-$C_1$-$C_8$ alkylene or benzoyl-methylene.

According to a preferred embodiment the quaternary ammonium salt (b) comprises an anion ii) which is preferably a non-nucleophilic anion, for example a complex halide anion, most preferably selected from the group consisting of $BF_4^-$, $PF_6^-$, $SbF_6^-$ and $SbF_5(OH)^-$.

Boron or phosphorous halide complexes wherein one or more halide is replaced by a phenyl group which is substituted with one or more electron attracting groups, preferably selected from —F, —$CF_3$, —$OCF_3$, —$NO_2$ and mixtures thereof, can also be used as anion ii).

The following may be mentioned as specific examples of the quaternary ammonium salts preferably used: 1-methylquinolinium hexafluorophosphate, 1-methylquinolinium hexafluoroantimonate, 1-methylquinolinium hexafluoroarsenate, 1-methylquinolinium pentafluorohydroxyantimonate, 1-methylquinolinium tetrafluoroborate, 1,2-dimethylquinolinium hexafluorophosphate, 1-ethylquinolinium hexafluorophosphate, 1-butylquinolinium hexafluorophosphate, 1-benzoylmethylquinolinium hexafluorophosphate, 1-benzoylmethylquinolinium hexafluoroantimonate, 1-benzylquinolinium hexafluorophosphate, 1-methyl-2,3-diphenylpyriclinium hexafluorophosphate, 1,2-dimethyl-3-phenylpyridinium hexafluorophosphate, 1-benzoyl-2-methylpyridinium hexafluorophosphate, 1-ethoxyethylquinolinium hexafluorophosphate, 2-methylisoquinolinium hexafluorophosphate, 10-methyl-acridinium hexafluorophosphate, 10-benzoylmethylacridinium hexafluorophosphate, 10-butylacridinium hexafluorophosphate, 5-methylphenanthriclinium hexafluorophosphate, 5-benzoylmethylphenanthridinium hexafluorophosphate, 1-methylnaphthyridium hexa-fluorophosphate, 1-methyl-2,3-diphenylquinoxalinium hexafluorophosphate, 1,2,3-trimethyl-quinoxalinium hexafluorophosphate, 1,2,4,6-tetramethylpyridinium hexafluorophosphate, 1-methyl-2,4-diphenylpyrimidinium hexafluorophosphate, 1-methyl-2,5-diphenylpyridazinium hexafluorophosphate, 1-methylphenanthrolinium hexafluorophosphate, 5-butylphenazinium hexafluorophosphate, 1-methylquinoxalinium hexafluorophosphate and 1-benzoylimethyl-quinoxalinium hexafluoro phosphate.

According to a preferred embodiment of the present invention the thermosetting composition comprises the quaternary ammonium salt (component (b)) in an amount up to 15 wt.-%, more preferably in an amount ranging from 1 to 13 wt.-% and most preferably from 2 to 10 wt.-%, based on the entire weight of the thermosetting composition.

Component (c):

The thermosetting composition according to the present invention can additionally comprise component (c) which is a compound comprising at least one epoxy group, preferably two or more epoxy groups.

It has been found that thermosetting compositions comprising the components (a), (b) and (c) demonstrate a significantly improved reactivity which lead to thermally cured products having a high glass transition temperature (Tg).

The epoxy resins and, in particular, the di- and polyepoxides and epoxy resin prepolymers of the type used for the preparation of crosslinked epoxy resins are especially important. The di- and polyepoxides can be aliphatic, cycloaliphatic or aromatic compounds. Illustrative examples of such compounds are the glycidyl ethers and β-methyl glycidyl ethers of aliphatic or cycloaliphatic diols or polyols, typically those of ethylene glycol, 1,2-propanediol, 1,3-propanediol, 1,4-butanediol, diethylene glycol, polyethylene glycol, polypropylene glycol, glycerol, trimethylolpropane or 1,4-dimethylolcyclohexane or of 2,2-bis(4-hydroxycyclohexyl)propane, the glycidyl ethers of di- and polyphenols, typically resorcinol, 4,4'-dihydroxydiphenylmethane, 4,4'-dihydroxydiphenyl-2,2-propane, novolaks and 1,1,2,2-tetrakis(4-hydroxyphenyl) ethane.

Other industrially important glycidyl compounds are the glycidyl esters of carboxylic acids, preferably of di- and polycarboxylic acid. Illustrative examples thereof are the glycidyl esters of succinic acid, adipic acid, azelaic acid, sebacic acid, phthalic acid, terephthalic acid, tetra- and hexahydrophthalic acid, isophthalic acid or trimellitic acid, or of dimerised fatty acids.

Exemplary of polyepoxides that differ from glycidyl compounds are the diepoxides of vinyl cyclohexene and dicyclopentadiene, 3-(3',4'-epoxycyclohexyl)-8,9-epoxy-2,4-dioxaspiro[5.5]undecane, the 3',4'-epoxycyclohexylmethyl ester of 3,4-epoxycyclohexanecarboxylic acid, butadiene diepoxide or isoprene diepoxide, epoxidised linoleic acid derivatives or epoxidised polybutadiene.

Preferred epoxy resins are diglycidyl ethers or advanced diglycidyl ethers of dihydroxy phenols or of dihydroxy aliphatic alcohols containing 2 to 4 carbon atoms. Particularly preferred epoxy resins are the diglycidyl ethers or advanced diglycidyl ethers of 2,2-bis(4-hydroxyphenyl)propane and bis(4-hydroxyphenyl)methane.

According to a preferred embodiment of the present invention the thermosetting composition comprises at least one cycloaliphatic epoxy component. Cycloaliphatic epoxy components selected from the group of components which are represented by the following formulae (XXV) to (XXIX) are especially preferred

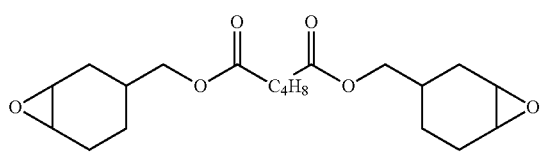
(XXV)

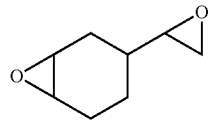
(XXVI)

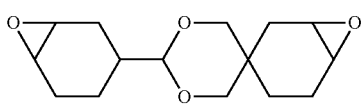
(XXVII)

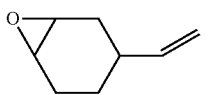
(XXVIII)

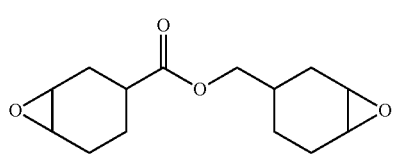
(XXIX)

Most preferred is the cycloaliphatic epoxy component which is represented by formula (XXIX).

According to a preferred embodiment of the present invention the thermosetting composition comprises an epoxy component (component (c)) which is liquid at 25° C. The liquid epoxy components can be used as reactive diluents and improve the workability of thermosetting compositions. Preferably, the thermosetting composition comprises at least one liquid epoxy component which has a viscosity up to 2500 mPa·s, more preferably up to 1000 mPa·s, especially between 50 and 1000 mPa·s, for example between 150 and 500 mPa·s (measured as dynamic viscosity at 25° C. according to ISO 12058-1:1997).

According to a preferred embodiment of the present invention the thermosetting composition comprises the components (a), (b) and (c) and the weight ratio of component (b) to the sum of components (a) and (c) is 1:1000 to 1:10.

Preferably, the weight ratio of component (a) to epoxy group containing component (c) is 95:5 to 10:90.

Another preferred embodiment is a thermosetting composition wherein the weight ratio of component (a) to quaternary ammonium salt (b) is 100:1 to 10:2, more preferably 50:1 to 10:1, especially 40:1 to 15:1.

A thermosetting composition wherein the weight ratio of phosphorous-free component comprising at least one dihydrobenzoxazine group (a) to epoxy compound (c) is preferably 15:1 to 2:3, especially preferably 8:1 to 2:1 represent preferred embodiments.

Component (c) is preferably present in an amount up to 55 wt.-%, more preferably in an amount ranging from 10 to 50 wt.-% and most preferably from 15 to 40 wt.-%, based on the entire weight of the thermosetting composition.

Component (d):

It has surprisingly been found that it is advantageous to use, in addition, a thermal radical initiator (component (d)), for example a pinacol or an ether, ester or silyl derivative thereof. Those compounds are known and can be prepared by known methods. Component (d) is preferably a 1,1,2,2-substituted-ethan-1,2-diol, for example, 1,1,2,2-tetraphenyl-1,2-ethanediol (benzpinacol) and benzpinacol dimethyl ether.

The thermosetting composition of the present invention can preferably comprise component (d) in an amount up to 20 wt.-%, more preferably in an amount ranging from 1 to 15 wt.-% and most preferably from 3 to 12 wt.-%, based on the entire weight of the thermosetting composition.

The properties of the thermosetting resins can be tailored for certain applications by addition of usual additives. The following additives are of particular importance:

reinforcement fibers, such as glass, quartz, carbon, mineral and synthetic fibers (Keflar, Nomex), natural fibres, such as flax, jute, sisal, hemp in the usual forms of short fibers, staple fibers, threads, fabrics or mats; plasticizers, especially phosphorus compounds; mineral fillers, such as oxides, carbides, nitrides, silicates and salts, e.g. quartz powder, fused silica, aluminium oxide, glass powder, mica, kaolin, dolomite, carbon black or graphite; pigments and dyestuffs; micro hollow spheres; metal powders; flame retardants; defoaming agents; slip agents; viscosity modifier; adhesion promoters; and mould release agents.

The thermosetting composition according to the invention can also comprise a solvent or a solvent mixture, especially when it is used as laminating or surface coating composition. Examples of solvents which are particularly suitable are selected from the group consisting of methylethylketone, acetone, N-methyl-2-pyrrolidone, N,N-dimethyl formamide, pentanol, butanol, dioxolane, isopropanol, methoxy propanol, methoxy propanol acetate, dimethylformamide, glycols, glycol acetates, toluene and xylene. The ketones and the glycols are especially preferred. Typically, the laminating composition comprises 20 to 30% by weight of solvent, based on the total weight of the composition.

The thermosetting composition according to the invention can be cured or pre-cured at temperatures of about 130 to 200° C., preferably 150 to 200° C. and in particular 160 to 180° C. for the manufacture of prepregs, laminates or hot melting moulding processes.

A further object of the present invention is the use of the thermosetting composition according to the present invention for a surface coating, a composite, a laminate, a casting resin, prepregs, prepregs for printed wiring boards, coatings for pipes, a resin of a resin transfer moulding process, wings of planes, blades of rotors, a matrix resin or adhesive for electronic components or a resin for automotive or aerospace applications.

The thermosetting compositions according to the invention can be used, for example, as solvent-free casting resins, surface coating resins, laminating resins, moulding resins, pultrusion resins, encapsulating resins and adhesives to produce moulded or coated articles or composites for the electrical and electronic industry, in the automotive and aerospace industry, or for surface protection of many articles, e.g. pipes and pipelines.

A further embodiment of the present invention is the use of the thermosetting composition according to the present invention for the manufacture of a moulded article or for a resin transfer moulding process.

It is especially preferred to use the thermosetting composition according to the invention for the manufacture of composites from prepregs or B stage resins, and RTM (resin transfer moulding) systems.

Curing of the composition and an impregnation and lamination process is explained in the following:

(1) The thermosetting composition according to the present invention is applied to or impregnated into a substrate by rolling, dipping, spraying or other known techniques and/or combinations thereof. The substrate is typically a woven or nonwoven fiber mat containing, for instance, glass fibers, carbon or mineral fibers or paper.

(2) The impregnated substrate is "B-staged" by heating at a temperature sufficient to evaporate solvent (if the latter is present) in the thermosetting composition and to partially cure the benzoxazin formulation, so that the impregnated substrate can be handled easily. The "B-staging" step is usually carried out at a temperature of from 80° C. to 190° C. and for a time of from 1 minute to 15 minutes. The impregnated substrate that results from "B-staging" is called a "prepreg". The temperature is most commonly 90° C. to 110° C. for composites and 130° C. to 190° C. for electrical laminates.

(3) One or more sheets of prepreg are stacked on top of each other or may alternate with one or more sheets of a conductive material, such as copper foil, if an electrical laminate is desired.

(4) The laid-up sheets are pressed at high temperature and pressure for a time sufficient to cure the resin and form a laminate. The temperature of this lamination step is usually between 100° C. and 240° C., and is most often between 165° C. and 190° C. The lamination step may also be carried out in two or more stages, such as a first stage between 100° C. and 150° C. and a second stage at between 165° C. and 190° C. The pressure is usually from 50 N/cm$^2$ and 500 N/cm$^2$. The lamination step is usually carried out for a time of from 1 minute to 200 minutes, and most often for 45 minutes to 90 minutes. The lamination step may optionally be carried out at higher temperatures for shorter times (such as in continuous lamination processes) or for longer times at lower temperatures (such as in low energy press processes).

(5) Optionally, the resulting laminate, for example, a copper-clad laminate, may be post-treated by heating for a time at high temperature and ambient pressure. The temperature of post-treatment is usually between 120° C. and 250° C. The post-treatment time usually is between 30 minutes and 12 hours.

Solid substrates for coating purposes may be selected from metal, metal alloys, wood, glass, minerals such as silicates, corundum or boron nitride, and plastics.

The cured resins possess a high chemical resistance, corrosion resistance, mechanical resistance, durability, hardness, toughness, flexibility, temperature resistance or stability (high glass transition temperatures), reduced combustibility, adhesion to substrates and de-lamination resistance.

A further embodiment of the present invention is a cured product manufactured from the thermosetting composition according to the present invention.

A further embodiment of the present invention is a process for the manufacturing of articles comprising the steps:
a) providing a fabric
b) impregnating the fabric with a thermosetting composition according to present invention and
c) curing the impregnated fabric.

Preferably, the fabric comprises or is consisting of a member of the group consisting of carbon fiber, glass fiber and mineral fiber. The manufactured articles are for example aerospace parts, automotive parts, prototypes, construction parts, especially for light weight constructions. The fabric in step a) is preferably provided in a mold.

EXAMPLES

The following examples explain the invention.
A) Preparation of Thermosetting Compositions

Example A1 to A3 and Comparative Examples C1 to C4

A mixture of (in parts by weight) component (a) dihydrobenzoxazine, component (b) a quaternary ammonium salt and optionally epoxy compound (c) is molten at 130-140° C., if necessary, and mixed under thorough stirring. The gel time of such homogenous mixture is measured on an hot plate at 190° C. The mixture is cured in an oven at 190° C. for 120 minutes and subsequently cured at 220° C. for further 120 min (see Examples A1 to A3 as well as comparative Examples C1 to C4).

The results are given in the following Tables 1 and 2.

Table 1 shows inventive Examples A1 to A3 according to the present invention and comparative examples C1 to C3. A1 to A3 demonstrate relatively short gel times upon heating which is due to the high reactivity. Unusual high glass transition temperatures result, especially when epoxy compounds have additionally been used. Further the difference between the temperature at which the exothermal curing can be observed in the DSC (onset T) and the temperature at which the maximum speed (peak T) of the reaction can be observed is relatively small. This behaviour makes the thermosetting compositions according to the present invention especially useful for resin transfer moulding processes in which a certain liquefied state is desired to form the shape of the desired article to be formed and during the subsequent curing process a rapid curing is desired which leads to cured resins with high glass transition temperatures (Tg after cure).

The difference between onset T and peak T indicates the reactivity of the system The smaler the difference the higher the reactivity.

TABLE 1

Thermosetting compositions according to the present invention (A1 to A3) and comparative examples C1 to C3; amounts of components referred to are mentioned in parts by weight.

| Components | C1 | A1 | C2 | A2 | A3 | C3 |
|---|---|---|---|---|---|---|
| dihydrobenzoxazine (1) | 5 | 5 | 5 | 5 | 5 | 5 |
| methylethylketone | 1.7 | 1.7 | 1.7 | 1.7 | 1.7 | 1.7 |
| 3,4-epoxycyclohexylmethyl-3,4-epoxycyclohexanecarboxylate | | | | | 1.5 | 1.5 |
| N-benzylquinolinium hexafluoroantimonate | | 0.25 | | 0.5 | 0.25 | |
| benzpinakol | | 0.15 | 0.3 | | 0.15 | |
| 2-methyl-imidazol | | | | | | 0.4 |
| gel time @190° C. [sec] | 1890 | 180 | 620 | 248 | 382 | 125 |
| DSC 30-350; 20° C./min | | | | | | |
| onset T[° C.] | 239 | 192 | 151/217 [2)] | 196 | 205 | 168/248 [2)] |
| peak T[° C.] | 254 | 218 | 175/241 [2)] | 217 | 238 | 200/270 [2)] |
| enthalpy [J/g] [1)] | 293 | 289 | 13/218 | 247 | 277 | 281 |
| Tg after 2 h at 190° C. | 172 | 178 | 165 | 175 | 202 | 182 |
| Tg after 2 h at 190° C. and 2 h at 220° C. | 172 | 181 | 179 | 196 | 210 | 182 |

[1)] enthalpy of the fresh mixture
[2)] two peaks observed (indicates a discontinous reaction)

Dihydrobenzoxazine (1) corresponds to formula (IV) with $X^3=-CH_2-$ (bisphenol F based dihydrobenzoxazine)

Table 2 shows comparative example C4 which is a thermosetting composition comprising a phosphorous containing dihydrobenzoxazine. The amounts of components referred to are mentioned in parts per weight.

TABLE 2

| Components | C4 |
|---|---|
| dihydrobenzoxazine (2) | 5 |
| N-benzylquinolinium hexafluoroantimonate | 0.25 |
| benzpinakol | 0.15 |
| gel time @190° C. [sec] | 50 |
| DSC 30-350; 20° C./min | |
| onset T [° C.] | |
| peak T [° C.] | 251/309 [2)] |
| enthalpy [J/g] | 17/55 |
| Tg after 2 h at 190° C. | 88 |
| Tg after 2 h at 190° C. and 2 h at 220° C. | 144 |

[1)] enthalpy of the fresh mixture
[2)] two peaks observed (indicates a discontinuous reaction)

Dihydrobenzoxazine (2) corresponds to formula (XXX) which is a phosphorous containing dihydrobenzoxazine disclosed in WO 02/057279 A1.

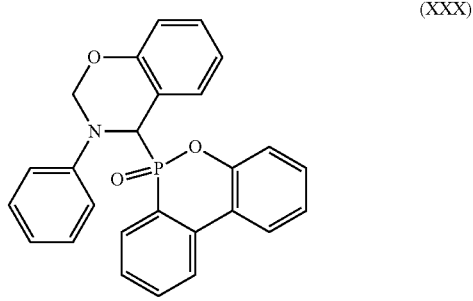 [SMILES: O=P1(C2c3ccccc3OCN2c2ccccc2)Oc2ccccc2-c2ccccc21]

(XXX)

The comparative example C4 shows a lower glass transition temperature after cure compared to the thermosetting composition according to the present invention A1 to A3. Additionally, the comparative example C4 decomposes upon heating.

The invention claimed is:

1. A thermosetting composition comprising
   (a) 50-90 wt % of at least one phosphorous-free bis(dihydrobenzoxazine) of formula (I),

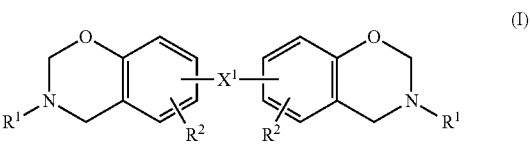

(I)

wherein
each $R^1$ is independently $C_1$-$C_{18}$ alkyl, $C_3$-$C_{12}$ cycloalkyl, $C_3$-$C_{12}$ cycloalkyl which is unsubstituted or substituted with a $C_1$-$C_4$-alkyl, or $C_6$-$C_{18}$ aryl which is unsubstituted or substituted by one or more $C_1$-$C_6$ alkyl groups or $C_1$-$C_6$ alkoxy groups;

each R² is independently hydrogen, dialkylamino, alkylthio, alkylsulfonyl, $C_1$-$C_{18}$ alkyl, $C_1$-$C_{18}$ alkenyl, $C_1$-$C_{18}$ alkoxy, $C_1$-$C_{18}$ alkoxy-$C_1$-$C_{18}$-alkylene, $C_5$-$C_{12}$ cyclo alkyl which is unsubstituted or substituted by one or more $C_1$-$C_6$ alkyl groups or $C_1$-$C_6$ alkoxy groups, $C_6$-$C_{12}$ aryl which is unsubstituted or substituted by one or more $C_1$-$C_6$ alkyl groups or $C_1$-$C_6$ alkoxy groups, or $C_6$-$C_{12}$ aryl-$C_1$-$C_{18}$-alkylene wherein the aryl moiety is unsubstituted or substituted by one or more $C_1$-$C_6$ alkyl groups or $C_1$-$C_6$ alkoxy groups;

$X^1$ is a bivalent bridging group selected from —O—, —S—, —S(O)—, —S(O)$_2$—, —C(O)—, —N(R³)—, —O—C(O)—, —O—C(O)—O—, —S(O)$_2$—O—, —O—S(O)$_2$—O—, $C_1$-$C_{18}$ alkylene, $C_2$-$C_{18}$ alkenediyl, $C_3$-$C_{12}$ cycloalkylene, $C_5$-$C_{12}$ cycloalkenediyl, —Si(OR³)$_2$— or —Si(R³)$_2$—; and R³ is H, $C_1$-$C_{12}$ alkyl, $C_5$ or $C_6$ cycloalkyl, $C_5$ or $C_6$ cycloalkyl substituted with methyl, ethyl, or phenyl, benzyl or phenyleth-2-yl;

(b) 1-13 wt % of at least one quaternary ammonium salt comprising
  i) a cation of an aromatic-N-heterocyclic compound which comprises one or two nitrogen atoms and
  ii) an anion;
(c) 1-15 wt % of a thermal radical initiator selected from a pinacol or an ether, ester or silyl derivative thereof; and
(d) 15-40 wt % of a compound comprising at least one epoxy group wherein the wt % is based on the entire weight of the thermosetting composition.

2. A thermosetting composition according to claim 1 wherein the quaternary ammonium salt (b) comprises a cation of a substituted or unsubstituted aromatic-N-heterocyclic compound which is selected from pyridine, pyrimidine, pyridazine, pyrazine, picoline, lutidine, quinoline, isoquinoline, quinoxaline, phthalazine, quinazoline, acridine, phenanthridine and phenanthroline.

3. A thermosetting composition according to claim 1 wherein the quaternary ammonium salt (b) comprises a cation of formulae (XIII), (XIV) and (XV):

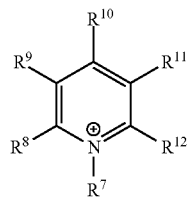

(XIII)

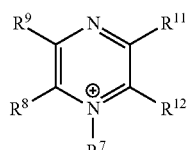

(XIV)

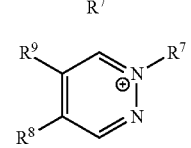

(XV)

wherein R⁷ is $C_1$-$C_{18}$ alkyl; aryl-$C_1$-$C_8$ alkylene wherein the aryl moiety is unsubstituted or substituted by one or more linear or branched $C_1$-$C_{12}$ alkyl, $C_1$-$C_8$ alkoxy-$C_1$-$C_8$ alkylene, $C_1$-$C_{12}$ alkyloxy, $C_1$-$C_{12}$ alkylcarbonyl, halogen or hydroxyl; $C_3$-$C_{15}$ alkoxy-$C_1$-$C_8$ alkylene or benzoyl-methylene;

each of R⁸, R⁹, R¹⁰, R¹¹ and R¹² independently of the other is hydrogen, $C_1$-$C_4$ alkyl or phenyl, or R⁸ and R⁹ or R⁹ and R¹⁰ or R¹⁰ and R¹¹ or R¹¹ and R¹², together with the two carbon atoms to which they are attached, are a fused benzo, naphtho, pyridino or quinolino radical.

4. A thermosetting composition according to claim 3, wherein R⁷ is selected from the group consisting of methyl, ethyl, n-propyl, iso-butyl, sec-butyl, test-butyl, dodecyl, octadecyl, benzyl, phenyleth-2-yl, acetyl and benzoyl.

5. A thermosetting composition according to claim 1 wherein the quaternary ammonium salt (b) comprises a cation selected from one or more of the formulae (XVI) to (XXIV) wherein Y is either —CH= or a nitrogen atom:

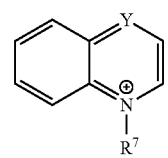

(XVI)

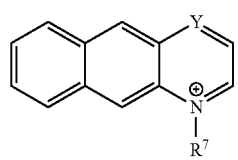

(XVII)

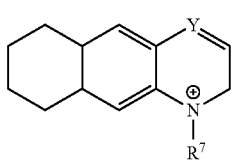

(XVIII)

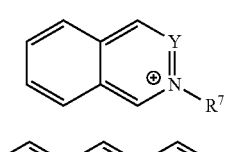

(XIX)

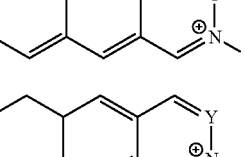

(XX)

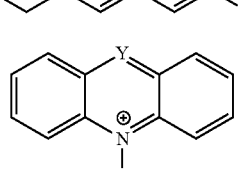

(XXI)

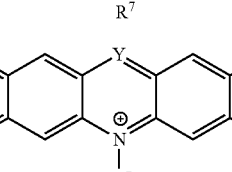

(XXII)

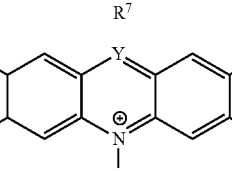

(XXIII)

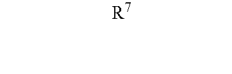

(XXIV)

wherein $R^7$ is $C_1$-$C_{18}$ alkyl; aryl-$C_1$-$C_8$ alkylene wherein the aryl moiety is unsubstituted or substituted by one or more linear or branched $C_1$-$C_{12}$ alkyl, $C_1$-$C_8$ alkoxy-$C_1$-$C_8$ alkylene, $C_1$-$C_{12}$ alkyloxy, $C_1$-$C_{12}$ alkylcarbonyl, halogen or hydroxyl; $C_3$-$C_{15}$ alkoxy-$C_1$-$C_8$ alkylene or benzoyl-methylene.

6. A thermosetting composition according to claim 1 wherein the quaternary ammonium salt (b) comprises a cation of the following formula:

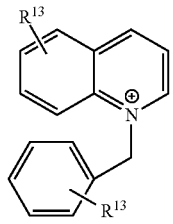

wherein each $R^{13}$ independently of the other is $C_1$-$C_{18}$ alkyl; aryl-$C_1$-$C_8$ alkylene wherein the aryl moiety is unsubstituted or substituted by one or more linear or branched $C_1$-$C_{12}$ alkyl, $C_1$-$C_8$ alkoxy-$C_1$-$C_8$ alkylene, $C_1$-$C_{12}$ alkyloxy, $C_1$-$C_{12}$ alkylcarbonyl, halogen or hydroxyl; $C_3$-$C_{15}$ alkoxy-alkylene or benzoyl-methylene.

7. A thermosetting composition according to claim 1 wherein the quaternary ammonium salt (b) comprises an anion ii) selected from the group consisting of $BF_4^-$, $PF_6^-$, $SbF_6^-$ and $SbF_5(OH)^-$.

8. A thermosetting composition according to claim 1 wherein weight ratio of component (a) to quaternary ammonium salt (b) is 100:1 to 10:2.

9. Process for the manufacturing of an article comprising the steps:
   a) providing a fabric
   b) impregnating the fabric with a thermosetting composition according to claim 1 and
   c) curing the impregnated fabric.

* * * * *